June 15, 1948. W. H. HAUSELMANN 2,443,580
MULTISPINDLE PATTERN ADAPTER
Filed Oct. 3, 1945 2 Sheets-Sheet 2

INVENTOR.
WILLIAM H. HAUSELMANN
BY
ATTORNEY.

Patented June 15, 1948

2,443,580

UNITED STATES PATENT OFFICE 2,443,580

MULTISPINDLE PATTERN ADAPTER

William H. Hauselmann, Wheatridge, Colo.; Mildred H. Hauselmann, executrix of said William H. Hauselmann, deceased Application October 3, 1945, Serial No. 620,096

11 Claims. (Cl. 77—23)

This invention relates to multi-purpose machine tools, and more particularly to multiple-spindle drilling machines and presses; and has as an object to provide improved means for selectively grouping and operatively holding the rotatively driven spindles of such machines in conformity with and for machining of a given pattern.

A further object of the invention is to provide improved means in a multiple-spindle machine tool for rapidly and conveniently adapting the operative pattern of the machine spindles to the requirements of a given operation.

A further object of the invention is to provide improved means for association with the conventional cluster-box of a multiple-spindle machine tool to selectively group and operatively hold the tool spindles in conformity with and for machining of given patterns variable throughout an extensive range without disturbance of the cluster-box mounting.

A further object of the invention is to provide improved means conveniently and rapidly removable and replaceable relative to a multiple-spindle machine tool cluster-box to adaptively group the machine spindles for a given machining operation.

A further object of the invention is to provide improved spindle grouping and holding means adapted for selectively removable and replaceable cooperation with conventional multiple-spindle cluster-box and machine tool assemblies of various types and constructions.

A further object of the invention is to provide improved spindle grouping and holding means for multiple-spindle machine tools, whereof the tool-pattern-defining elements are susceptible of convenient production to any desired particular pattern, through the application of ordinary machine tools to readily-available materials.

With the foregoing and other objects in view, my invention consists in the construction, arrangement, and combination of elements hereinafter set forth, pointed out in my claims, and illustrated by the accompanying drawings, in which—

Figure 1:
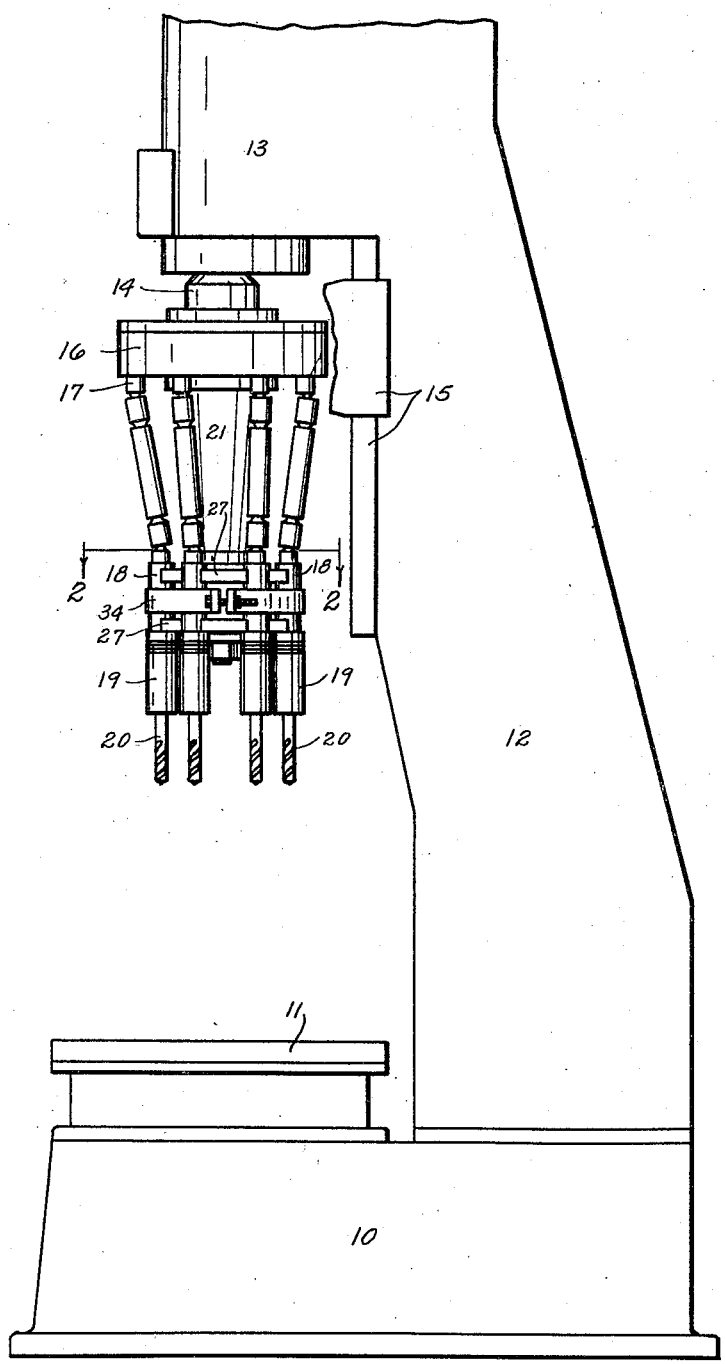
Figure 3:
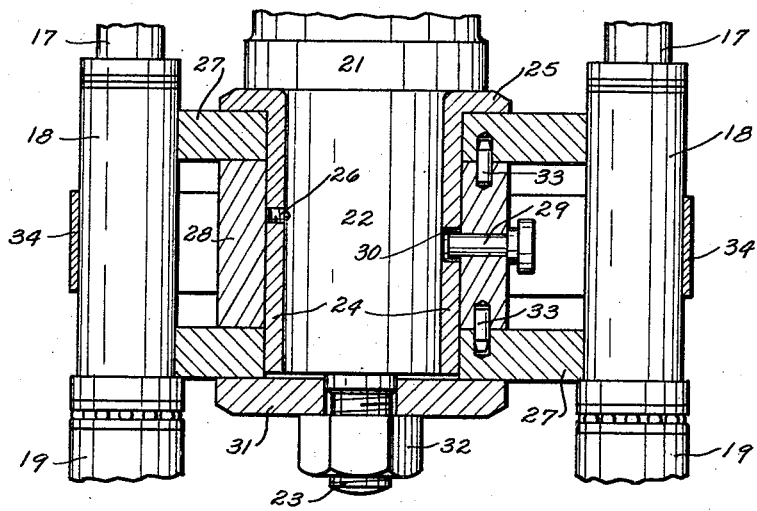
Figure 2:
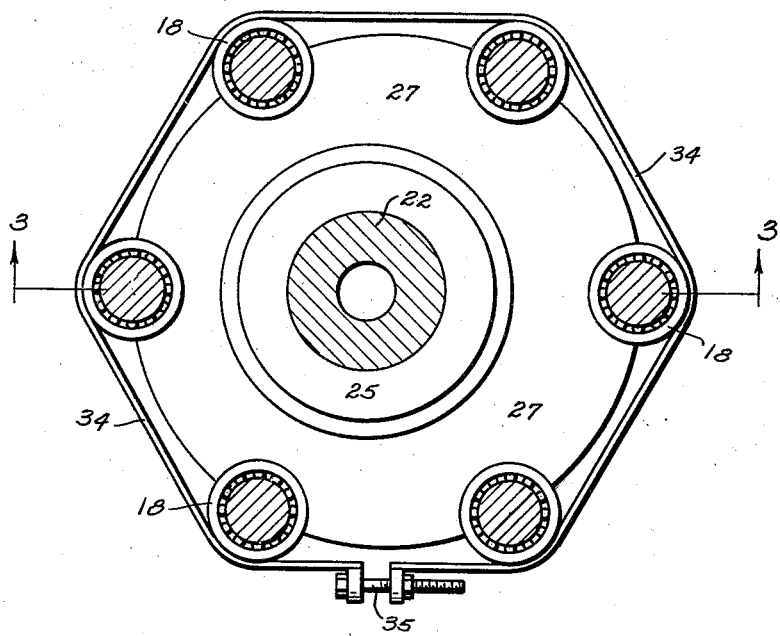

Figure 1 is a somewhat diagrammatic side elevation of a conventional drill press wherewith the improvement is operatively combined ready for practical use. Figure 2 is a cross section, on an enlarged scale, taken on the indicated line 2—2 of Figure 1. Figure 3 is a vertical section taken substantially on the indicated line 3—3 of Figure 2.

It has become common machine shop practice to utilize multiple-spindle machine tools to expedite operations incident to quantity production. Where the volume of production is great, the multiple-spindle tools employed may be constructed and permanently arranged to accomplish a given operation according to but one particular pattern, but when the production volume does not warrant such special tools, it is feasible to employ a tool arrangement such as permits of adjustment and variation in the spindle grouping to conform with various desired patterns; and it is to the provision of means wherethrough the selective grouping of conventional machine tool spindles may be expedited and facilitated that the instant invention is directed.

Multiple-spindle machine tools arranged for selective pattern-grouping of their spindles are commonly available in various specific constructions adapted to accomplish various machining operations; and a typical such tool is shown in Figure 1 as comprising a base 10 supporting a work table 11, a standard 12 fixedly rising from the base 10 to support a fixed head 13 in overhanging relation with the table 11, an operative head assembly 14 altitudinally reciprocable between the table 11 and head 13 in guided and driven engagement with and through the latter and in guided relation with the standard 12 through the agency of slide-related means 15, a cluster-box 16 of conventional construction carried by and operatively associated with the lower end of the operating head 14, and a plurality of spindles 17 rotatably associated in driven relation with and depending through the lower surface of the cluster-box 16. The spindles 17 may be of any specific construction and operative association with the elements to be driven thereby as may be suited to their function and purpose, such spindles being commonly in use with varying detail of structure, but, in general, the said spindles are uniformly spaced concentrically about and depend in synchronously-driven relation from the cluster-box 16 in such number as is normally adequate to accomplish the various operations within the effective scope of the machine tool. The driven elements of the spindles 17 exterior to the cluster-box 16 conveniently connect through universal joints and telescopically-associated sleeves with and to drive stems 18 axially and rotatively within spindle bodies 18 which serve to rotatably mount and position chuck members 19 wherein the machining elements, such as drills 20, may be removably and replaceably set and secured for power rotation transmitted thereto from a power unit of the machine through the head 14, cluster-box 16, and individual spindles and spindle elements 17, 18 and 19. All of the foregoing is typical construction of machine tools now commonly in use, various means and arrangements having been heretofore provided for grouping and holding the spindle bodies 18 in conformity with and for machining by the elements 20 to a selected pattern.

The improved pattern adapter of the instant invention is arranged for use with the conventional elements of the machine tool to engage, group, and hold the spindle bodies 18, or equivalent elements, of conventional multiple-spindle assemblies. To mount and position the improved adapter for use with apparatus of the type shown, a rigid stem 21 is formed on or fixedly secured in any desired manner to the lower face of the cluster-box 16 and depends axially therefrom and toward the table 11 a suitable distance determined for a given machine by the length of the spindle assemblies between said cluster-box and the spindle bodies 18. The lower end of the stem 21 is finished as a straight cylindrical boss 22 in axial alignment with said stem and in shouldered connection of its upper end with the stem lower end, and a threaded stud 23 projects in fixed relation with and axially from the boss 22 lower end. The axial length of the boss 22 is preferably somewhat less than the length of a spindle body 18 and said boss is so related with the cluster-box 16 as to lie in substantially the same zone with the spindle bodies 18 when the latter are operatively associated and connected with the driven elements of the cluster-box. A bearing sleeve 24 is sized to telescope over and fit closely about the boss 22 and is formed with a radial flange 25 outstanding from and about one of its ends for engagement against the shoulder at the end of the stem 21, in which position said sleeve is removably and replaceably locked to the boss 22, as by means of a headless set screw 26, or equivalent arrangement. The outer surface of the sleeve 24 is finished as a true cylinder axially coincident with the stem 21 and operating head 14, and the inner surface of the flange 25 is finished as a plane truly perpendicular to the sleeve axis and hence joining the sleeve cylindrical exterior surface at a precise right angle.

The sleeve 24 functions to mount and precisely position a pair of pattern adapter plates 27, identical in size, form, and construction, wherewith the spindle bodies 18 are clampably associated to dispose the tool elements 20 thereof for development of the desired pattern in and on the work to be machined. Each plate 27 is a flat member of rigid material, such as metal, of substantial thickness, and of such peripheral outline as may be determined by the pattern at which the spindle bodies are to be grouped. The plates 27 are formed with circular central apertures sized to telescopically receive and fit closely about the exterior surface of the sleeve 24, and the outer margins of said plates 27 are intersected by semicircular notches adapted to embracingly receive and seat the spindle bodies 18, the number and arrangement of said notches conforming with the desired work pattern in such manner as to center the spindle bodies in the same relation with the plates 27 as is presented by the centers of the operations to be had on or developed in the work to be accomplished. As is apparent, a pair of plates 27 is required for each of the work patterns whereto the machine equipped with the improved adapter is to be applied, and said plates are susceptible of convenient production in any normally-equipped shop by centrally aperturing blanks of suitable stock, then drilling holes of diameters corresponding to the spindle body 18 diameter simultaneously through the two pieces of stock in conformity with the desired work pattern, and then cutting away the stock material exterior to the lines joining the centers of adjacent drilled holes, the plates so resulting being eccentrically circular, as shown in Figure 2, or having any such other outline as the drilled hole arrangement may produce.

Two identical adapter plates 27 having been provided, one of said plates is mounted on and slipped upwardly about the sleeve 24 carried by the boss 22 until the upper plate margin engages against the sleeve flange 25, whereafter a tubular spacing block 28, bored to snugly receive the sleeve 24, is engaged about said sleeve and urged upwardly into end engagement against the upper plate 27 lower surface, in which position a latch pin 29 carried by and movable radially of the block 28 is actuated to engage at its inner end within a recess or hole 30 formed for such purpose in a wall of the sleeve 24 and thereby latch the block 28 to said sleeve and against gravity-induced separation therefrom, said block thereby likewise retaining the upper plate 27 in position and relieving an operator of the necessity for holding said elements in intially-mounted relation on the stem 21 lower end. The upper plate 27 and block 28 being in position, the lower plate 27 is engaged with and on the lower end of the sleeve 24, the dimensions of the plates 27 and block 28 being such as to dispose the under surface of the lower plate 27 somewhat below the lower end of the sleeve 24 and boss 22, and a circular, centrally-apertured pressure plate or heavy washer 31 is engaged about the stud 23 with its outer margin bearing against the lower plate 27 under surface and is pressure-urged upwardly to clamp the two plates 27 and intermediate block 28 axially and solidly against the sleeve flange 25 by means of a nut 32 threadedly engaged with the stud 23 to bear against the lower surface of the element 31. To position the separate plates 27 angularly about the sleeve 24 for alignment of the plate notches in a manner to receive and mount the spindle bodies 18 in axial relation with said sleeve and its associated boss 22, opposite ends of the block 28 seat oppositely-extending dowel pins 33 in axial alignment parallel with the block axis, and the opposite ends of said dowel pins project beyond their associated block ends to engage within holes formed for such purpose in the adjacent plate 27 surfaces, said holes being correspondingly located in their respective plates at the time of plate manufacture to insure aligned registration of the corresponding plate notches when said holes are aligned in the manner shown and described.

A pair of adapter plates 27 denoting the desired work pattern having been clamped to the stem 21 lower end with their marginal notches aligned in the manner shown and described, a spindle body 18 of the machine tool assembly is seated in each pair of so-aligned notches and thus positioned with its axis parallel to the operating axis and reciprocating plane of the head 14, the universal joints and telescoping sleeve of each spindle assembly adapting as the spindle body is shifted to maintain driven relation between the cluster-box spindle portion 17 and the chuck member 19 rotatably associated with said spindle body. When a spindle body 18 is thus engaged in each pair of plate 27 aligned notches, a flexible band 34, or equivalent non-extensible element, is engaged exteriorly about the group of spindle bodies between the plate 27 planes and suitably tightened, as by means of a bolt 35 engaging through apertured end lugs on said band, to firmly clamp and securely hold said spindle bodies in seated relation in the plate notches and with the tool elements carried by said spindle bodies grouped and individually centered to conform with the work pattern characteristic of said plates. When and as so assembled, conventional operation of the machine tool equipped with the improvement is productive of a machined pattern exactly conforming with the work pattern whereto the plates 27 have been formed.

The spindle bodies 18 are commonly shouldered adjacent their lower ends, as shown, in which case such shoulders may conveniently engage the lower plate 27 under surface and limit axially-upward travel of the bodies relative to the plates 27 under applied operating pressures, but the construction and manipulative arrangement of the band 34 may easily be such as to so grip said bodies to the plates as to inhibit relative movement therebetween during normal tool operations. A chain of any suitable construction may of course replace the flat strip type of element 34 shown, and any suitable type of clamp means may be substituted for the bolt 35 as a band tightening and tensioning agency, such structural variations being clearly comprised within the contemplation of the invention.

Obviously, a pair of plates 27 is required for each work pattern which the machine tool is to accomplish, but the construction of the improved pattern adapter is such as to ease and facilitate manufacture of the paired plates to hold and position the requisite number of spindle bodies, within the spindle capacity of the machine tool, in almost any desired arrangement, and to ease, expedite, and facilitate interchange of such paired plates on a given machine tool for alteration of the tool work pattern, when and as desired.

Since many changes, variations, and modifications in the specific form, construction, and arrangement of the elements shown and described may be had without departing from the spirit of my invention, I wish to be understood as being limited solely by the scope of the appended claims, rather than by any details of the illustrative showing and foregoing description.

I claim as my invention:

1. The combination with a machine tool having a plurality of selectively-adjustable, synchronously-driven spindles, of a pair of identical, independently-manipulatable, adapter plates removably and replaceably secured in spaced parallelism to and in fixed relation with the spindle-carrying machine tool head, spindle-seating notches conforming to a desired work pattern in aligned registration marginally of said plates for the positioning reception of operatively-connected spindles, and means independent of and operatively mountable between said plates for clampably securing a pertinent spindle element in seated relation with each aligned pair of plate notches.

2. The combination with a machine tool having a plurality of selectively-adjustable, synchronously-driven spindles, of a pair of identical, independently - manipulatable adapter plates marginally notched for the positioning reception of operatively-connected spindles in conformity with a desired work pattern, means for removably and replaceably assembling said plates in spaced parallelism and aligned notch registration on and in fixed relation with the spindle-carrying machine tool head, and means independent of and operatively mountable between said plates for clampably securing a pertinent spindle element in seated relation with each aligned pair of plate notches.

3. The combination with a machine tool having a plurality of selectively-adjustable, synchronously-driven spindles, of a pair of identical, independently - manipulatable, adapter plates formed with spindle-seating marginal notches conforming with a desired work pattern for the positioning reception of operatively-connected spindles, means for removably and replaceably assembling said plates in spaced parallelism and aligned notch registration on and in fixed relation with the spindle-carrying machine tool head, and a flexible, non-extensible independent member constrictible in exterior engagement about pertinent spindle elements between said plates to simultaneously clamp the latter in seated relation with the aligned plate notches and in bridging relation between said plates.

4. The combination with a machine tool having a reciprocable cluster-box, a plurailty of spindles synchronously driven from and selectviely adjustable relative to said cluster-box, and a spindle mounting body operatively associated with each of said spindles, of a stem fixedly projecting from the same side of the cluster-box as and within the cluster of said spindles, a pair of identical, independently-manipulatable, adapter plates removably and replaceably assembled in spaced parallel relation on the free end of said stem, spindle mounting body seating notches arranged in conformity with a desired work pattern in aligned registration marginally of said plates for the positioning reception of spindle bodies while operatively connected, and means independent of and operatively mountable between said plates for clampably securing a spindle mounting body in seated relation with each aligned pair of plate notches.

5. The combination with a machine tool having a reciprocable cluster-box, a plurality of tool-operating spindle assemblies synchronously driven from and selectively adjustable relative to said cluster-box, and a spindle mounting body included in each spindle assembly, of a stem fixedly projecting from the same side of the cluster-box as and within the cluster of said spindle assemblies, a pair of identical, independently-manipulatable, adapter plates formed with spindle mounting body seating notches opening marginally therefrom in conformity with a desired work pattern for the positioning reception of spindle bodies while operatively connected, means for removably and replaceably assembling said plates in spaced parallelism and aligned notch registration on the free end of said stem, and means independent of and operatively mountable between said plates engageable exteriorly about spindle mounting bodies seated in said aligned notches to simultaneously clamp said bodies to and in bridging relation between said plates in accordance with the notch-determined work pattern.

6. In a machine tool having a reciprocable cluster-box, a plurality of tool-operating spindle assemblies synchronously driven from and selectively adjustable relative to said cluster-box, and a spindle mounting body included in each spindle assembly, a spindle pattern adapter comprising a stem fixedly projecting from the spindle-intersected side of said cluster-box within the spindle assembly cluster, a pair of identical, independently-manipulatable plates removably and replaceably secured in spaced parallelism to the free end of said stem, spindle mounting body seating notches opening in aligned registration marginally from said plates in conformity with a desired work pattern for the positioning reception of spindle bodies while operatively connected, and means independent of and operatively mountable between said plates for clampably securing a spindle mounting body in seated relation with each aligned pair of plate notches.

7. In a machine tool having a reciprocable cluster-box, a plurality of tool-operating spindle assemblies synchronously driven from and selectively adjustable relative to said cluster-box, and a spindle mounting body included in each spindle assembly, a spindle pattern adapter comprising a stem fixedly projecting from the spindle-intersected side of said cluster-box within the spindle assembly cluster, a cylindrical boss on the free end of said stem, a pair of like, centrally-apertured plates engageable on and about said boss, a tubular spacing block engageable on and about said boss between said plates, means for clampably securing said plates and block together and to said boss, spindle mounting body receiving and seating notches opening marginally from said plates in conformity with a desired work pattern, means on said plates and block interengageable to position and hold corresponding plate notches in registered alignment, and means for clampably securing a spindle mounting body in seated relation with each aligned pair of plate notches.

8. In a machine tool having a reciprocable cluster-box, a plurality of tool-operating spindle assemblies synchronously driven from and selectively adjustable relative to said cluster-box, and a spindle mounting body included in each spindle assembly, a spindle pattern adapter comprising a stem fixedly projecting from the spindle-intersected side of said cluster-box within the spindle assembly cluster, a cylindrical boss on the free end of said stem, a mounting sleeve formed with a radially-exterior end flange removably and replaceably engaging said boss with its flanged end remote from the boss free end, centrally-apertured plates engageable on and about said sleeve, a tubular spacing block engageable on and about said sleeve between said plates, means for latching said block to and against separation from said sleeve, a threaded stud projecting axially from the boss free end, a nut and washer cooperating with said stud to clamp said plates and spacing block together and against the sleeve end flange, spindle mounting body receiving and seating notches opening marginally from said plates in conformity with a desired work pattern, means on said plates and block interengageable to position and hold corresponding plate notches in registered alignment, and flexible, non-extensible means clampable exteriorly about spindle mounting bodies seated in said paired notches in bridging relation between said plates to simultaneously secure said bodies in pattern-conforming disposition of their associated tool elements.

9. A pattern adapter for multiple-spindle machine tools, comprising a pair of identical, independently-manipulatable plates removably and replaceably mountable in spaced, parallel, fixed relation on the spindle head of the machine, notches conforming with a desired work pattern opening marginally in paired registration from said plates for the positioning reception of operatively-connected spindles, and means independent of and operatively mountable between said plates for clampably securing a spindle element in seated relation with each aligned pair of plate notches.

10. A pattern adapter for multiple-spindle machine tools, comprising a stem mountable in fixed relation on the spindle head of the machine, a pair of identical, independently-manipulatable plates removably and replaceably engageable on and in spaced, parallel relation with the free end of said stem, notches conforming with a desired work pattern opening marginally from said plates for the positioning reception of operatively-connected spindles, means for positioning and holding said plates in aligned registration of their corresponding notches, and means independent of and operatively mountable between said plates for simultaneously clamping a corresponding number of spindle elements in seated relation with the so-paired plate notches.

11. A pattern adapter for multiple-spindle machine tools, comprising a stem mountable in fixed relation on the spindle head of the machine, a pair of like plates removably and replaceably engageable on the free end of said stem, a tubular spacing block engageable on said stem free and between said plates to dispose and maintain the latter in spaced, parallel relation, means for clampably securing said plates and block together and to said stem free end, notches conforming with a desired work pattern opening marginally from said plates, means on said plates and block interengageable to position and hold corresponding plate notches in registered alignment, and means for simultaneously clamping a corresponding number of spindle elements in seated relation with the so-paired plate notches.

WILLIAM H. HAUSELMANN.

REFERENCES CITED

The following references are of record in the file of this patent:

UNITED STATES PATENTS

| Number | Name | Date |
|---|---|---|
| 783,416 | Bryan | Feb. 28, 1905 |
| 1,781,109 | Herzberg et al. | Nov. 11, 1930 |
| 2,126,508 | Schmitter | Aug. 9, 1938 |
| 2,388,621 | Sirp et al. | Nov. 6, 1945 |